United States Patent
Porat et al.

(10) Patent No.: US 11,062,462 B2
(45) Date of Patent: Jul. 13, 2021

(54) DETECTION OF VISUAL TRACKER DIVERGENCE

(71) Applicant: International Business Machines Corporation, Armonk, NY (US)

(72) Inventors: Dror Porat, Haifa (IL); Tal Hakim, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 16/225,078

(22) Filed: Dec. 19, 2018

(65) Prior Publication Data

US 2020/0202541 A1     Jun. 25, 2020

(51) Int. Cl.
    *G06T 7/246*         (2017.01)
    *G06T 7/215*         (2017.01)
    *G06K 9/32*          (2006.01)

(52) U.S. Cl.
    CPC ............ *G06T 7/248* (2017.01); *G06K 9/3233* (2013.01); *G06T 7/215* (2017.01); *G06K 2009/3291* (2013.01)

(58) Field of Classification Search
    CPC ........ G06T 7/248; G06T 7/215; G06K 9/3233
    USPC ....................................................... 382/103
    See application file for complete search history.

(56) References Cited

U.S. PATENT DOCUMENTS

| | | | |
|---|---|---|---|
| 7,429,108 | B2 | 9/2008 | Rosenberg |
| 7,817,822 | B2 * | 10/2010 | Sun .......................... G06K 9/32 348/103 |
| 8,094,122 | B2 | 1/2012 | Molander et al. |
| 9,092,520 | B2 * | 7/2015 | Yang .................. G06K 9/00751 |
| 2015/0286872 | A1 | 10/2015 | Medioni et al. |
| 2016/0191902 | A1 * | 6/2016 | Acquavella ............... G06T 7/50 348/46 |
| 2017/0053167 | A1 * | 2/2017 | Ren .......................... G06T 3/40 |
| 2018/0286030 | A1 * | 10/2018 | Sadasivam ......... H04N 5/23222 |
| 2019/0130583 | A1 * | 5/2019 | Chen ................... G06K 9/00711 |
| 2019/0206065 | A1 * | 7/2019 | Ju ............................. G06T 7/74 |

FOREIGN PATENT DOCUMENTS

CN           101894378         9/2012

\* cited by examiner

*Primary Examiner* — Congvan Tran
(74) *Attorney, Agent, or Firm* — Dvir Gassner

(57) ABSTRACT

A system comprising at least one hardware processor; and a non-transitory computer-readable storage medium having stored thereon program instructions, the program instructions executable by the at least one hardware processor to: receive, as input, video data, perform a first tracking, using a tracking algorithm, of an identified target in a sequence of frames of said video data, wherein said first tracking is performed forward in time, perform a second tracking, using said tracking algorithm, of said target in said sequence, wherein said second tracking is performed backward in time, and calculate a confidence score for a tracked location of said target in a frame of said sequence, based, at least in part, on a comparison between said first tracking and said second tracking.

18 Claims, 3 Drawing Sheets

DETECTION OF VISUAL TRACKER DIVERGENCE

BACKGROUND

The invention relates to the field of automated visual tracking of objects.

Visual object tracking is considered a fundamental task in computer vision and vision-based analysis. High level video analysis applications typically require the objects of interest to be tracked over time. Single object tracking is a well-researched topic for which a diverse set of approaches and a rich collection of algorithms have been produced to date. Tracking can be considered an almost solved problem when objects in a scene are isolated and easily distinguishable from the background, however the problem is still challenging in real world applications because of occlusions, cluttered backgrounds, fast and abrupt motions, dramatic illumination changes, and large variations over the viewpoint and poses of the target.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a system comprising at least one hardware processor; and a non-transitory computer-readable storage medium having stored thereon program instructions, the program instructions executable by the at least one hardware processor to: receive, as input, video data, perform a first tracking, using a tracking algorithm, of an identified target in a sequence of frames of said video data, wherein said first tracking is performed forward in time, perform a second tracking, using said tracking algorithm, of said target in said sequence, wherein said second tracking is performed backward in time, and calculate a confidence score for a tracked location of said target in a frame of said sequence, based, at least in part, on a comparison between said first tracking and said second tracking.

There is also provided, in an embodiment, a method comprising receiving, as input, video data; performing a first tracking, using a tracking algorithm, of an identified target in a sequence of frames of said video data, wherein said first tracking is performed forward in time; performing a second tracking, using said tracking algorithm, of said target in said sequence, wherein said second tracking is performed backward in time; and calculating a confidence score for a tracked location of said target in a frame of said sequence, based, at least in part, on a comparison between said first tracking and said second tracking.

There is further provided, in an embodiment, a computer program product comprising a non-transitory computer-readable storage medium having program code embodied therewith, the program code executable by at least one hardware processor to: receive, as input, video data; perform a first tracking, using a tracking algorithm, of an identified target in a sequence of frames of said video data, wherein said first tracking is performed forward in time; perform a second tracking, using said tracking algorithm, of said target in said sequence, wherein said second tracking is performed backward in time; and calculate a confidence score for a tracked location of said target in a frame of said sequence, based, at least in part, on a comparison between said first tracking and said second tracking.

In some embodiments, said sequence comprises between 1-200 frames.

In some embodiments, said comparison comprises calculating a difference parameter between said tracked location in each of said first and second trackings.

In some embodiments, said difference parameter is calculated separately with respect to each frame in said sequence.

In some embodiments, said program instructions are further executable to determine, and in the case of the method, the method further comprises determining, a loss-of-tracking condition when said confidence score is below a specified threshold.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
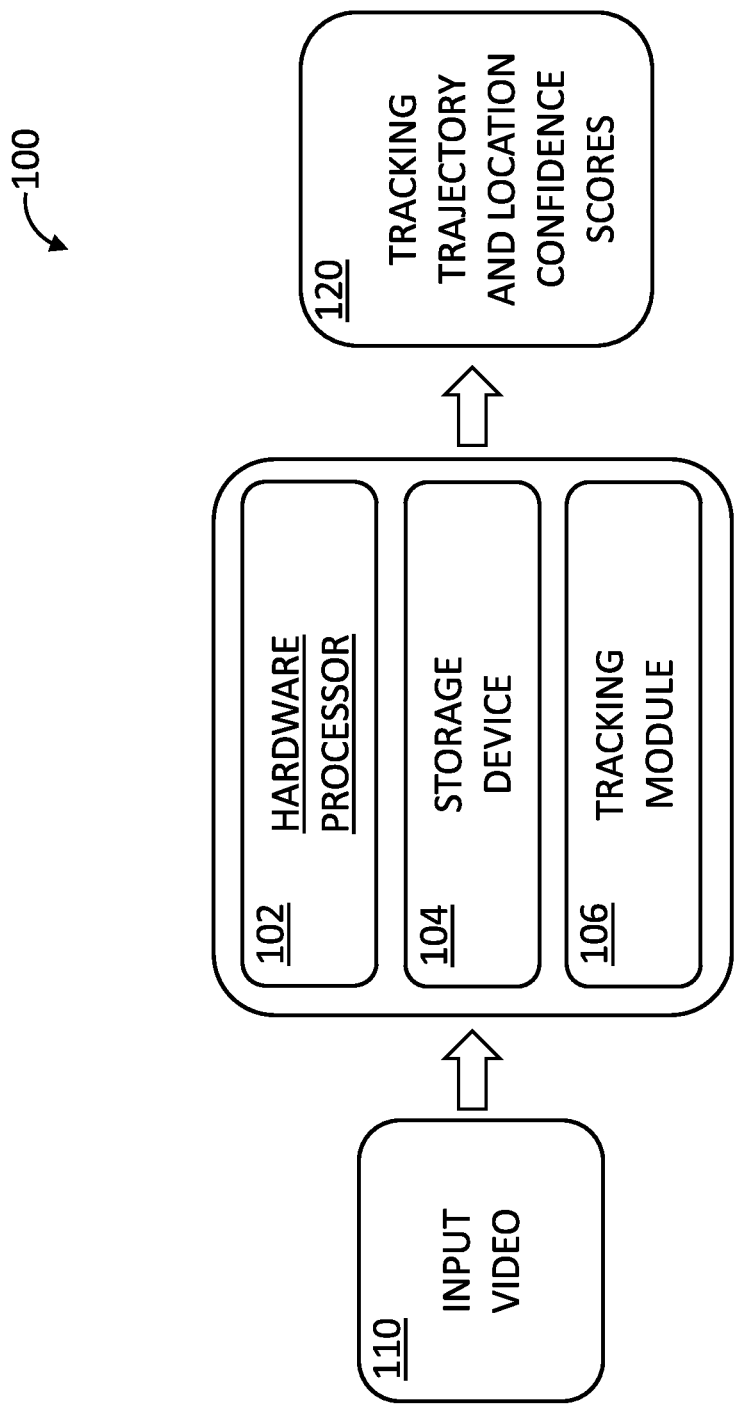
FIG. 1 is a block diagram of an exemplary system for automated visual tracking using a two-way scheme, according to an embodiment.

Disclosed herein are a system, method, and computer program product for enhancing visual tracking accuracy using two-way tracking.

Visual tracking of an object in a video is a fundamental problem in computer vision, with numerous applications, including surveillance, human-computer interaction, and autonomous vehicle navigation.

As used herein, the term "tracking" and its variants refer to a process that is motion-based. The objective of visual tracking is to associate target objects in consecutive image frames of the video. Given a generic target object specified by a bounding box in an image frame, the goal of object tracking is to estimate the unknown target states, e.g., position and scale, in subsequent image frames. For example, in a typical surveillance application, one or more cameras are placed to cover an area of interest. As an object traverses a camera's field of view, an object-tracking algorithm searches each sequential image frame for the object, based on the appearance of the object within a prior image frame.

To perform video tracking, a tracking algorithm analyzes sequential video frames, and outputs the movement of targets between the frames. There are a variety of known tracking algorithms, each having strengths and weaknesses. Considering the intended use is important when choosing which algorithm to use. The two major components of a visual tracking system are target representation and localization, and filtering and data association.

Target representation and localization is concerned with identifying a moving object using a variety of methods, such as blob tracking (is useful for identifying human movement), kernel-based tracking, and contour tracking. Filtering and data association involves incorporating prior information about the scene or object, dealing with object dynamics, and evaluation of different hypotheses. These methods allow the tracking of objects along with object interaction, such as an object moving behind obstruction.

Significant challenges to object tracking arise due to appearance variations caused by deformation, sudden motion, illumination change, occlusion, and/or target disappearance in the camera view. Generally, the amount of change from frame to frame is limited, and the identification of a similar, albeit not identical, object in each sequential frame can be achieved using known object tracking algorithms.

Object-tracking becomes even more difficult if an object disappears from a scene, then reappears at a different location in the scene, or in a different scene. Such a disappearance-then-reappearance may be the result of a temporary occlusion, for example, as the target passes behind an obstacle, such as a pillar or tree, as the target exits through a door from one surveillance scene to another, as the target enters then exits a non-surveyed area, such as a restroom or closet, and so on. When a target's reappearance differs in time and/or space from the time and place of its disappearance, this may lead to tracking divergence, commonly defined as a tracker gradually deviating from the true target location, and finally failing to track altogether. The difficulty is further compounded because some objects may disappear and never re-appear in a scene, for example when a target leaves the surveyed area entirely.

When tracked target is lost, tracking should be halted and the system notified of the loss-of-track condition. However, some tracking algorithms may fail to detect a loss-of-track condition and continue to return a tracking vector, whether or not the target is still actually visible near the predicted position. Hence, detecting the loss-of-track may require additional validation.

Accordingly, in some embodiments, the present invention provides for detection of tracking loss using a two-way tracking scheme. In some embodiments, the disclosed invention employs one or more known tracking algorithms for tracking an object in a video sequence. In some embodiments, the tracking algorithms may be selected from the group consisting of mean-shift tracker, a particle filter tracker, a covariance tracker, a Kalman filter tracker, an ensemble tracker, an exhaustive search tracker, and an online classifier tracker.

In some embodiments, a tracked object may be bound within a box representing an area with the smallest measure within which all the points associated with the object lie.

In some embodiments, a tracked object in a given image frame may be used as an input for a second, 'backwards,' instance of the one or more tracking algorithms, in which the object may be tracked within a specified number of image frames preceding the given frame. In some embodiments, the present invention may be configured for generating a confidence score for the tracking based, at least in part, on an agreement parameter between the initial object tracking and the backwards pass.

A potential advantage of the present invention is, therefore in that it provides for an automated process for improving the accuracy of tracking algorithms and reducing the risk of tracking divergence and/or loss. The present invention is easy to implement and adaptable for use with most commonly known tracking algorithms, without requiring any prior learning and/or training of the algorithm.

FIG. 1 is a block diagram of an exemplary system 100 for automated visual tracking using a two-way scheme, according to an embodiment. System 100 may comprise one or more hardware processors 102, and a non-transitory computer-readable storage device 104. System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. In various embodiments, system 100 may comprise one or more dedicated hardware devices, one or more software modules, and/or may form an addition to or extension to an existing device.

Storage medium 104 may have encoded thereon software instructions or components configured to operate a processing unit (also "hardware processor," "CPU," or simply "processor"), such as hardware processor(s) 102. In some embodiments, the software components may include an operating system, including various software components and/or drivers for controlling and managing general system tasks (e.g., memory management, storage device control, power management, etc.), and facilitating communication between various hardware and software components. In some embodiments, the program instructions are segmented into one or more software modules, which may comprise, e.g., a tracking module 106.

Figure 2:
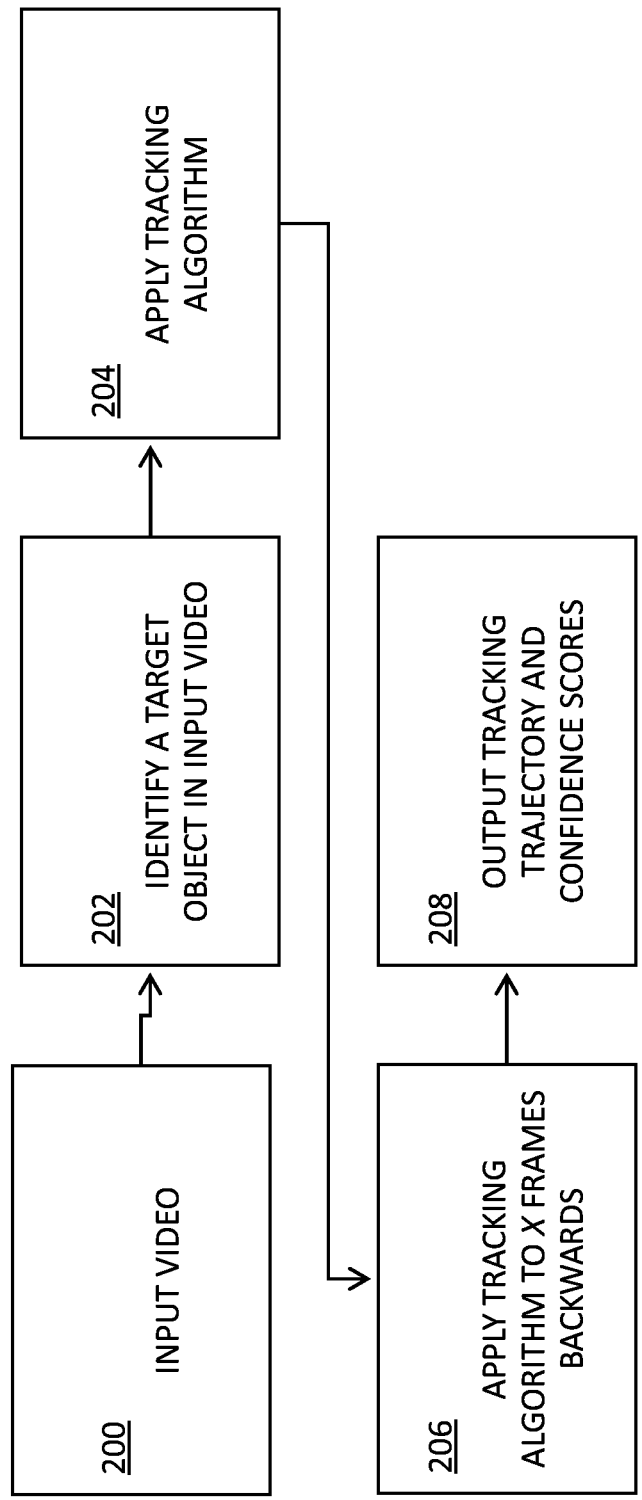
FIG. 2 is a flowchart illustrating the functional steps of a process for automated visual tracking using a two-way scheme, according to an embodiment.
Figure 3:
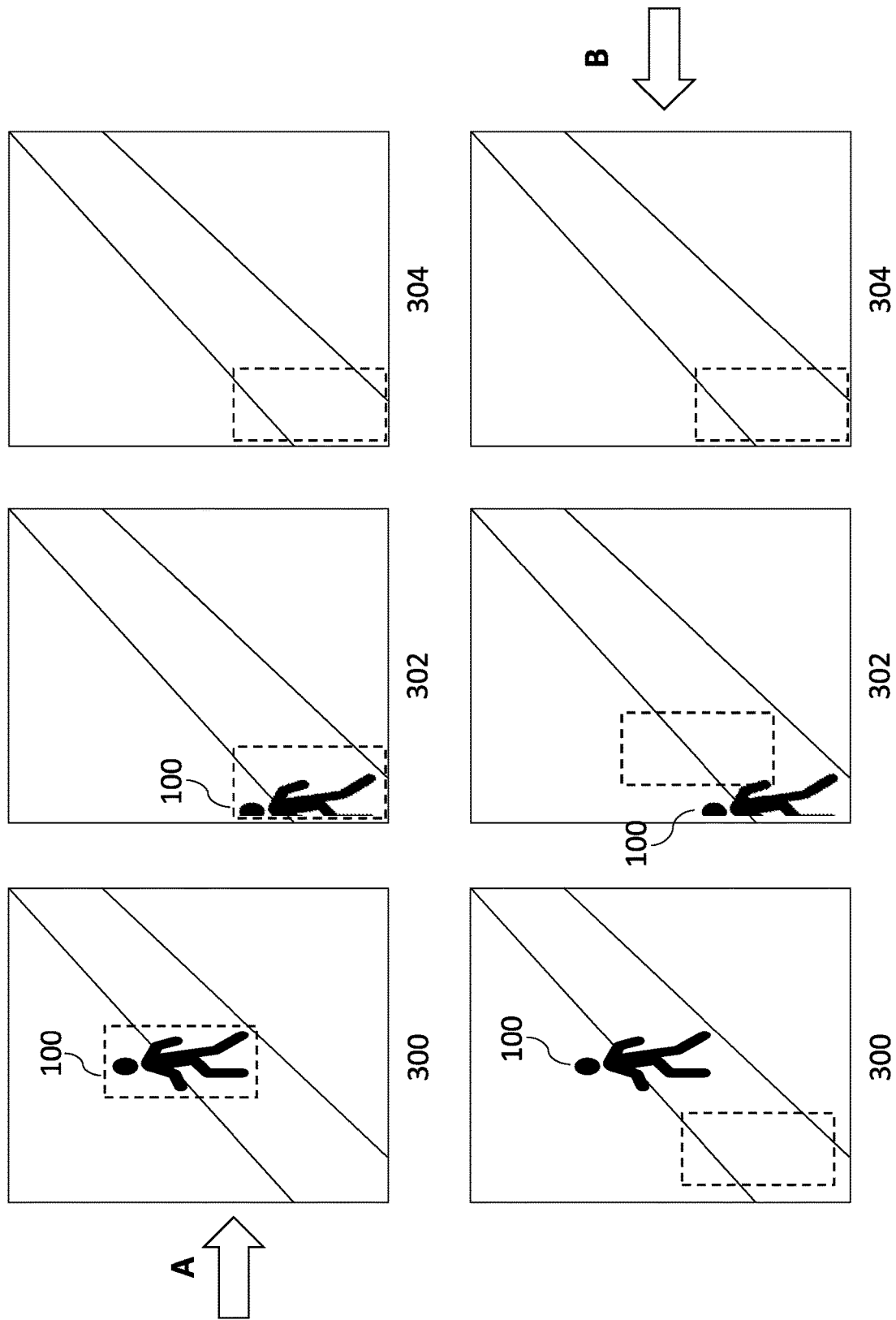
FIG. 3 is a schematic illustration of two-way visual tracking, according to an embodiment.

An overview of the functional steps in a process for automated visual tracking using a two-way scheme will now be provided with continuing reference to FIG. 2 and the flowchart in FIG. 3.

At a step 200 in FIG. 2, an input video is received by a system, such as system 100 in FIG. 1. The input video may comprise a sequence of image frames depicting, e.g., a target subject walking within an area of coverage of a video camera, as shown in image frames 300-304 in FIG. 3.

At a step 202, tracking module 106 has identified a location of a target in an image. For example, 'forward' instance A of tracking module 106 depicted in FIG. 3, has identified a target in frame 300, and applied a bounding box to the target.

At a step 204, a visual tracking algorithm may be applied by tracking module 106 of system 100. In some embodiments, the tracking algorithm may be any known tracking algorithm, and may be applied without any prior learning and/or training of the algorithm. Accordingly, tracking module 106 begins tracking the target identified in step 202, e.g., through frames 302 and 304. In some embodiments, tracking module 106 calculates a tracking trajectory for the target based, at least in part, on the tracking. In some embodiments, due to target occlusion and/or complete disappearance (e.g., in frame 304), the calculated trajectory for the target diverges from the actual location of the target.

At a step 206, tracking module 106 may be configured for validating a calculated target location in frame 304 that is based on the calculated trajectory, by applying the tracking algorithm in a second tracking instance B backward in time, with respect to a specified number of frames preceding frame 304, e.g., frames 302 and 300. In some embodiments, the specified number of preceding frames included in the backward tracking instance B may be between 1-200 frames, however, more or fewer frames may be used in other instances.

Accordingly, in some embodiments, a target identified by tracking instance A in, e.g., frame 304, may be tracked by instance B backwards, to frames 302 and 300. In some embodiments, tracking module 106 may be configured for calculating a difference parameter with respect to a calculated target location identified by each of instances A and B with respect to each pair of corresponding frames included in both instances.

In some embodiments, the difference parameter may be calculated by tracking module 106 based, at least in part, on a different calculated target location in corresponding pair of frames in each of tracking instances A and B. For example, a difference parameter between each pair of corresponding frames in instances A and B may be calculated based, e.g., on a spatial disparity between the tracked location in each corresponding frame.

In some embodiments, tracking module 106 may further be configured for generating a plurality of confidence scores associated with the target location in each pair of corresponding frames, based, at least in part, on the difference parameters calculated for each pair of locations identified by instances A and B. In some embodiments, a low confidence score for one or more corresponding pairs may indicate a tracking error associated with, e.g., tracking divergence and/or loss. In some embodiments, a tracking error may be indicated when the confidence score is below a specified threshold.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   at least one hardware processor; and
   a non-transitory computer-readable storage medium having stored thereon program instructions, the program instructions executable by the at least one hardware processor to:
   receive, as input, video data,
   perform a first tracking, using a tracking algorithm, of an identified target in a sequence of frames of said video data, wherein said sequence comprises between 2-201 frames, and wherein said first tracking is performed forward in time,
   perform a second tracking, using said tracking algorithm, of said target in said sequence, wherein said second tracking is performed backward in time, and
   calculate a confidence score for a tracked location of said target in a frame of said sequence, based, at least in part, on a comparison between said first tracking and said second tracking.

2. The system of claim 1, wherein said comparison comprises calculating a difference parameter between said tracked location in each of said first and second trackings.

3. The system of claim 2, wherein said difference parameter is calculated separately with respect to each frame in said sequence.

4. The system of claim 1, wherein said program instructions are further executable to determine a loss-of-tracking condition when said confidence score is below a specified threshold.

5. The system of claim 4, wherein said program instructions are further executable to prevent said tracking algorithm from continuing to return a tracking vector when said target is not visible near the tracked location, by halting the first tracking when the loss-of-tracking condition is determined.

6. A computer program product comprising a non-transitory computer-readable storage medium having program code embodied therewith, the program code executable by at least one hardware processor to:
   receive, as input, video data;
   perform a first tracking, using a tracking algorithm, of an identified target in a sequence of frames of said video data, wherein said sequence comprises between 2-201 frames, and wherein said first tracking is performed forward in time;
   perform a second tracking, using said tracking algorithm, of said target in said sequence, wherein said second tracking is performed backward in time; and
   calculate a confidence score for a tracked location of said target in a frame of said sequence, based, at least in part, on a comparison between said first tracking and said second tracking.

7. The computer program product of claim 6, wherein said comparison comprises calculating a difference parameter between said tracked location in each of said first and second trackings.

8. The computer program product of claim 7, wherein said difference parameter is calculated separately with respect to each frame in said sequence.

9. The computer program product of claim 6, wherein said program code is further executable to determine a loss-of-tracking condition when said confidence score is below a specified threshold.

10. The computer program product of claim 9, wherein said program instructions are further executable to prevent said tracking algorithm from continuing to return a tracking vector when said target is not visible near the tracked location, by halting the first tracking when the loss-of-tracking condition is determined.

11. A system comprising:
    at least one hardware processor; and
    a non-transitory computer-readable storage medium having stored thereon program instructions, the program instructions executable by the at least one hardware processor to:
    receive, as input, video data,
    perform a first tracking, using a tracking algorithm, of an identified target in a sequence of frames of said video data, wherein said first tracking is performed forward in time,
    perform a second tracking, using said tracking algorithm, of said target in said sequence, wherein said second tracking is performed backward in time, and
    calculate a confidence score for a tracked location of said target in a frame of said sequence, based, at least in part, on a comparison between said first tracking and said second tracking, wherein said comparison comprises calculating a difference parameter between said tracked location in each of said first and second trackings, and wherein said difference parameter is calculated separately with respect to each frame in said sequence.

12. The system of claim 11, wherein said program instructions are further executable to determine a loss-of-tracking condition when said confidence score is below a specified threshold.

13. The system of claim 12, wherein said program instructions are further executable to prevent said tracking algorithm from continuing to return a tracking vector when said target is not visible near the tracked location, by halting the first tracking when the loss-of-tracking condition is determined.

14. A computer program product comprising a non-transitory computer-readable storage medium having program code embodied therewith, the program code executable by at least one hardware processor to:
receive, as input, video data;
perform a first tracking, using a tracking algorithm, of an identified target in a sequence of frames of said video data, wherein said first tracking is performed forward in time;
perform a second tracking, using said tracking algorithm, of said target in said sequence, wherein said second tracking is performed backward in time; and
calculate a confidence score for a tracked location of said target in a frame of said sequence, based, at least in part, on a comparison between said first tracking and said second tracking, wherein said comparison comprises calculating a difference parameter between said tracked location in each of said first and second trackings, and wherein said difference parameter is calculated separately with respect to each frame in said sequence.

15. The computer program product of claim 14, wherein said program code is further executable to determine a loss-of-tracking condition when said confidence score is below a specified threshold.

16. The computer program product of claim 15, wherein said program code is further executable to prevent said tracking algorithm from continuing to return a tracking vector when said target is not visible near the tracked location, by halting the first tracking when the loss-of-tracking condition is determined.

17. A system comprising:
at least one hardware processor; and
a non-transitory computer-readable storage medium having stored thereon program instructions, the program instructions executable by the at least one hardware processor to:
receive, as input, video data,
perform a first tracking, using a tracking algorithm, of an identified target in a sequence of frames of said video data, wherein said first tracking is performed forward in time,
perform a second tracking, using said tracking algorithm, of said target in said sequence, wherein said second tracking is performed backward in time,
calculate a confidence score for a tracked location of said target in a frame of said sequence, based, at least in part, on a comparison between said first tracking and said second tracking,
determine a loss-of-tracking condition when said confidence score is below a specified threshold, and
prevent said tracking algorithm from continuing to return a tracking vector when said target is not visible near the tracked location, by halting the first tracking when the loss-of-tracking condition is determined.

18. A computer program product comprising a non-transitory computer-readable storage medium having program code embodied therewith, the program code executable by at least one hardware processor to:
receive, as input, video data;
perform a first tracking, using a tracking algorithm, of an identified target in a sequence of frames of said video data, wherein said first tracking is performed forward in time;
perform a second tracking, using said tracking algorithm, of said target in said sequence, wherein said second tracking is performed backward in time;
calculate a confidence score for a tracked location of said target in a frame of said sequence, based, at least in part, on a comparison between said first tracking and said second tracking;
determine a loss-of-tracking condition when said confidence score is below a specified threshold; and
prevent said tracking algorithm from continuing to return a tracking vector when said target is not visible near the tracked location, by halting the first tracking when the loss-of-tracking condition is determined.

* * * * *